United States Patent
Shin et al.

(10) Patent No.: US 11,655,147 B2
(45) Date of Patent: May 23, 2023

(54) SYSTEM AND METHOD FOR GENERATING HYDROGEN THROUGH AMMONIA ADSORPTION

(71) Applicants: HYUNDAI MOTOR COMPANY, Seoul (KR); KIA MOTORS CORPORATION, Seoul (KR)

(72) Inventors: Byeong Soo Shin, Uiwang-si (KR); Kyung Moon Lee, Uiwang-si (KR); Young Jin Cho, Gimhae-si (KR); Hoon Mo Park, Seongnam-si (KR); Dong Hoon Nam, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 163 days.

(21) Appl. No.: 17/188,233

(22) Filed: Mar. 1, 2021

(65) Prior Publication Data

US 2022/0119250 A1     Apr. 21, 2022

(30) Foreign Application Priority Data

Oct. 20, 2020   (KR) .......................... 10-2020-0136241

(51) Int. Cl.
*C01B 3/04* (2006.01)
*B01J 8/02* (2006.01)
*B01D 53/04* (2006.01)
*B01D 53/047* (2006.01)

(52) U.S. Cl.
CPC ............ *C01B 3/047* (2013.01); *B01D 53/047* (2013.01); *B01D 53/0462* (2013.01); *B01J 8/0278* (2013.01); *B01D 2256/16* (2013.01); *B01D 2257/102* (2013.01); *B01D 2257/406* (2013.01); *B01D 2259/404* (2013.01); *B01D 2259/40052* (2013.01); *B01D 2259/40067* (2013.01)

(58) Field of Classification Search
CPC .... C01B 3/047; B01J 8/0278; B01D 53/0462; B01D 53/047; B01D 2259/40067; B01D 2257/102; B01D 2257/406; B01D 2259/404; B01D 2259/40052; B01D 2256/16

See application file for complete search history.

(56) References Cited

U.S. PATENT DOCUMENTS

| | | | | |
|---|---|---|---|---|
| 3,111,387 | A * | 11/1963 | Avery .................... | G01S 3/8038 95/103 |
| 3,564,816 | A * | 2/1971 | Batta .................... | B01D 53/047 95/143 |
| 2001/0009125 | A1* | 7/2001 | Monereau .......... | B01D 53/0423 95/135 |
| 2003/0172808 | A1* | 9/2003 | Le Bec ................ | B01D 53/047 95/143 |
| 2005/0257685 | A1* | 11/2005 | Baksh ...................... | C01B 3/56 95/96 |

FOREIGN PATENT DOCUMENTS

| | | | | |
|---|---|---|---|---|
| CA | 2 117 319 A1 * | 1/1995 | ............. | B01D 53/02 |
| JP | 2009-035458 A | 2/2009 | | |
| JP | 2015-059075 A | 3/2015 | | |
| JP | 2017-104778 A | 6/2017 | | |

* cited by examiner

*Primary Examiner* — Timothy C Vanoy
(74) *Attorney, Agent, or Firm* — Lempia Summerfield Katz LLC

(57) ABSTRACT

A system for generating hydrogen includes an ammonia decomposition bed configured to introduce an ammonia gas, decompose the ammonia gas into a high-pressure first mixed gas including nitrogen and hydrogen, and discharge the high-pressure first mixed gas; an ammonia adsorption bed supplied with the high-pressure first mixed gas from the ammonia decomposition bed, and configured to adsorb ammonia of the first mixed gas, and discharge a high-pressure second mixed gas including nitrogen and hydrogen; and a nitrogen adsorption bed directly supplied with the high-pressure second mixed gas from the ammonia adsorption bed, and configured to adsorb the nitrogen, and discharge the hydrogen.

12 Claims, 9 Drawing Sheets

FIG. 2

| STAGE | 1 | 2 | 3 | 4 | 5 | 6 | 7 |
|---|---|---|---|---|---|---|---|
| BED 1 | ADSORPTION | ADSORPTION | ADSORPTION | PRESSURIZED CONNECTION / ADSORPTION | ADSORPTION | ADSORPTION CONNECTION / ADSORPTION | STANDBY |
| BED 2 | PRESSURE EQUALIZATION | STANDBY | STANDBY | PRESSURIZED CONNECTION | STANDBY | ADSORPTION CONNECTION | ADSORPTION |
| BED 3 | HEATING AND DESORPTION | STANDBY | COOLING AND CLEANING | COOLING AND CLEANING | COOLING AND CLEANING | COOLING AND CLEANING | STANDBY |
| BED 4 | PRESSURE EQUALIZATION | STANDBY | HEATING AND DESORPTION | HEATING AND DESORPTION | HEATING AND DESORPTION | HEATING AND DESORPTION | HEATING AND DESORPTION |

FIG. 6

| STAGE | 1 | 2 | 3 | 4 | 5 | 6 | 7 |
|---|---|---|---|---|---|---|---|
| BED 1 | ADSORPTION | | | PRESSURIZED CONNECTION | | ADSORPTION CONNECTION | STANDBY |
| BED 2 | PRESSURE EQUALIZATION | STANDBY | | PRESSURIZED CONNECTION | STANDBY | ADSORPTION CONNECTION | ADSORPTION |
| BED 3 | HEATING AND DESORPTION | STANDBY | COOLING AND CLEANING | | | | STANDBY |
| BED 4 | PRESSURE EQUALIZATION | STANDBY | HEATING AND DESORPTION | | | | |

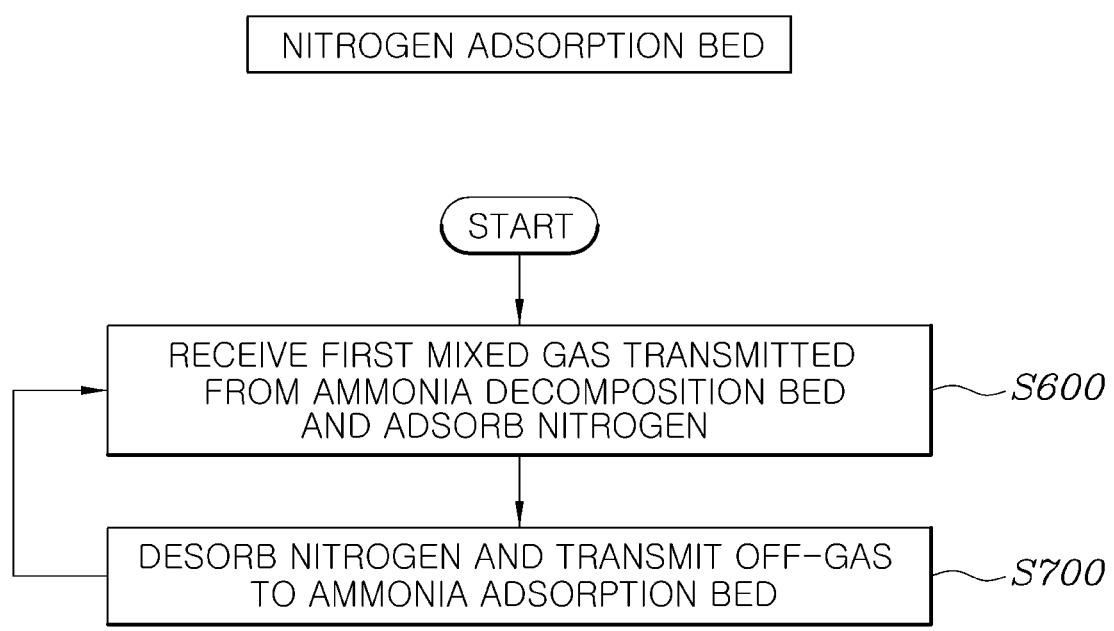

SYSTEM AND METHOD FOR GENERATING HYDROGEN THROUGH AMMONIA ADSORPTION

CROSS REFERENCE TO RELATED APPLICATION

This application claims priority to and the benefit of Korean Patent Application No. 10-2020-0136241, filed on Oct. 20, 2020, the entire contents of which are incorporated herein by reference.

FIELD

The present disclosure relates to a system and a method for generating hydrogen through ammonia adsorption, which can enable a stable operation of a nitrogen removal process.

BACKGROUND

The statements in this section merely provide background information related to the present disclosure and may not constitute prior art.

Recently, with the occurrence of environmental needs for low carbon to zero carbon, hydrogen is in the limelight as a substitute of new energy. In case of the hydrogen, technology to perform power generation through new renewable energy and to store the hydrogen as energy through water decomposition has frequently been reviewed.

Further, as a method capable of producing hydrogen in an environmentally friendly manner without generating carbon compounds such as carbon dioxide or carbon monoxide, a scheme for utilizing ammonia has been reviewed. Also, since a liquefaction process is necessary for transporting the hydrogen over a long distance or storing the hydrogen, and there is difficulty in managing the high-pressure gas, the ammonia may be adopted as a moving object transporting the hydrogen.

Accordingly, a method for producing $CO_2$-free hydrogen through ammonia decomposition is attracting attention. During the ammonia decomposition, hydrogen, nitrogen, and trace unreacted ammonia mixed gas are generated, and in order to generate high-purity hydrogen, a system for removing ammonia and nitrogen is necessary.

As a method for removing the ammonia, there is a method for dissolving the ammonia in water, but we have discovered that this method causes a large amount of wastewater to be generated when the ammonia is dissolved in water. Accordingly, a process capable of processing a large amount of ammonia in an environmentally friendly manner is desired. Further, we have found that since pure hydrogen can be obtained only through simultaneous removal of the nitrogen, a system capable of removing even the nitrogen together with ammonia is desired.

The foregoing is intended merely to aid in the understanding of the background of the present disclosure, and is not intended to mean that the present disclosure falls within the purview of the related art that is already known to those of ordinary skill in the art.

SUMMARY

The present disclosure can increase efficiency of the system since ammonia and nitrogen removal processes are associated with each other, and does not require a separate compressor between an ammonia adsorption bed and a nitrogen adsorption bed since the system of the present disclosure directly transmits and operates a high-pressure gas. Further, the present disclosure provides a system and a method capable of generating hydrogen, which can enable a stable operation of the process since there is a small change in gas composition with the use of an off-gas when the ammonia adsorption bed is heated or cooled.

According to one form of the present disclosure, a system for generating hydrogen includes: an ammonia decomposition bed configured to introduce an ammonia gas, decompose the ammonia gas into a high-pressure first mixed gas including nitrogen and hydrogen, and discharge the first mixed gas; an ammonia adsorption bed supplied with the high-pressure first mixed gas from the ammonia decomposition bed, and configured to adsorb residual ammonia of the first mixed gas, and discharge a high-pressure second mixed gas including nitrogen and hydrogen; and a nitrogen adsorption bed directly supplied with the high-pressure second mixed gas from the ammonia adsorption bed, and configured to adsorb the nitrogen, and discharge the hydrogen.

The ammonia adsorption bed may include a plurality of first bed modules, and the plurality of first bed modules may each independently perform an ammonia adsorption process, an ammonia desorption process, and a cleaning process, and the nitrogen adsorption bed may include a plurality of second bed modules, and the plurality of second bed modules may each independently perform a nitrogen adsorption process and a nitrogen desorption process.

The plurality of first bed modules may be connected in parallel through a discharge line, the discharge line may be connected to the plurality of second bed modules, and in case that the modules adsorbing the ammonia among the first bed modules are connected to the second bed modules through the discharge line to provide the second mixed gas, connection of the remaining first bed modules to the discharge line may be cut off.

The plurality of second bed modules may be connected in parallel to an off-gas supply line, the plurality of first bed modules may be connected in parallel through a desorption line and a cleaning line, and the desorption line and the cleaning line may be branched from the off-gas supply line.

The second bed module may supply an off-gas, including nitrogen generated through the nitrogen desorption process, to the ammonia adsorption bed through the off-gas supply line, and the first bed modules of the ammonia adsorption bed may each independently perform the ammonia desorption process and the cleaning process using the off-gas.

The plurality of first bed modules may be connected in parallel through a pressure equalization line, and the first bed module scheduled to perform the adsorption process may be connected to the first bed module having terminated the adsorption process through the pressure equalization line and may perform an equalization process before the adsorption process.

The adsorption-scheduled first bed module may be connected, through the pressure equalization line, to the first bed module performing the adsorption process after the equalization process and may perform a pressurization process before the adsorption process.

The adsorption-scheduled first bed module may be connected to the ammonia decomposition bed after the pressurization process and may perform the ammonia adsorption process.

According to another form of the present disclosure, a method for generating hydrogen includes: decomposing an ammonia gas into a high-pressure first mixed gas including nitrogen and hydrogen through an ammonia decomposition bed; adsorbing ammonia through transmission of the high-pressure first mixed gas to an ammonia adsorption bed, and discharging a high-pressure second mixed gas including nitrogen and hydrogen; and adsorbing the nitrogen and discharging the hydrogen through direct transmission of the high-pressure second mixed gas from the ammonia adsorption bed to a nitrogen adsorption bed.

The plurality of first bed modules may be provided with an off-gas including the nitrogen desorbed, from the second bed modules, and may each independently perform the ammonia adsorption process and the cleaning process.

A space speed of the off-gas being supplied in the ammonia adsorption process of the first bed modules may be equal to or higher than 1000 $h^{-1}$ and equal to or lower than 2000 $h^{-1}$, and a space speed of the off-gas being supplied in the cleaning process of the first bed modules may be equal to or higher than 6000 $h^{-1}$.

According to the system and the method for generating hydrogen through ammonia adsorption according to the present disclosure, the efficiency of the system can be increased since the ammonia and nitrogen removal processes are associated with each other, and a separate compressor is not necessary between the ammonia adsorption bed and the nitrogen adsorption bed since the system directly transmits and operates the high-pressure gas. Further, since the off-gas is used when the ammonia adsorption bed is heated or cooled, there is a small change in the gas composition, which makes it possible to stably operate the processes.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 1 and 2 are a drawing and a process chart showing a first-stage process of a system for generating hydrogen through ammonia adsorption according to one form of the present disclosure, respectively;

FIGS. 5 and 6 are a drawing and a process chart showing a sixth-stage process of the system for generating hydrogen through ammonia adsorption according to one form of the present disclosure, respectively;

Figure 8:
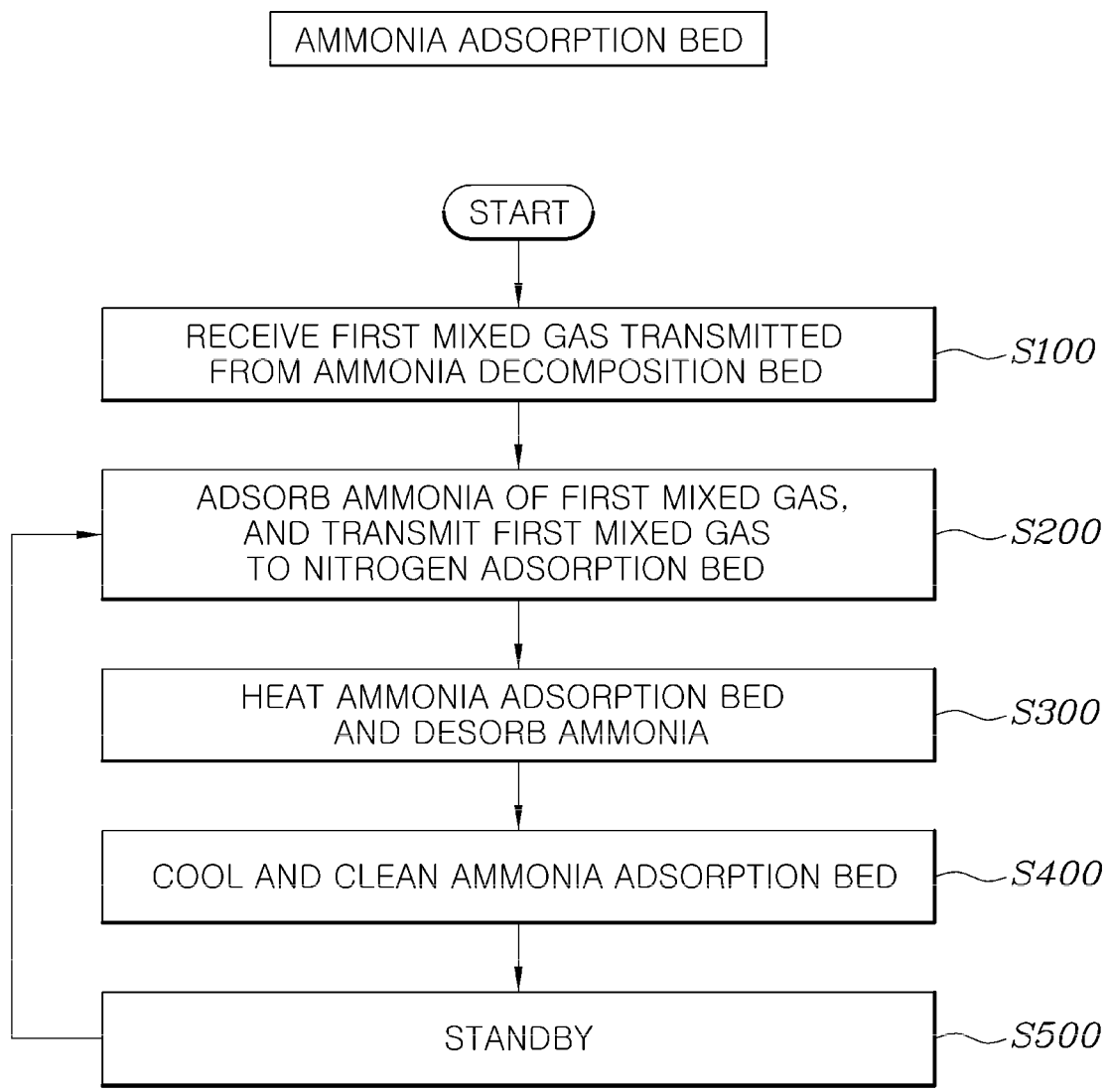

FIG. 8 is a flowchart of a generation method occurring in an ammonia adsorption bed in a method for generating hydrogen through ammonia adsorption according to one form of the present disclosure; and FIG. 9 is a flowchart of a generation method occurring in a nitrogen adsorption bed in the method for generating hydrogen through ammonia adsorption according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In forms of the present disclosure disclosed in the present specification or application, specific structural and/or functional explanations are merely exemplified for the purpose of explaining the exemplary forms of the present disclosure, and the exemplary forms according to the present disclosure may be carried out in various forms, and should not be interpreted to be limited to the forms described in the present specification or application.

Since the exemplary forms according to the present disclosure may be variously modified and may have various forms, specific forms will be exemplified in the drawings and will be described in detail in the present specification or application. However, it should be understood that the forms according to the concept of the present disclosure are not limited to the specific disclosed forms, but include all modifications, equivalents, and/or alternatives that are included in the idea and technical scope of the present disclosure.

The terms, such as "first and/or second", may be used to describe diverse constituent elements, but the constituent elements should not be limited by the terms. The terms are only for the purpose of discriminating one constituent element from another constituent element, and for example, without departing from the scope according to the concept of the present disclosure, a first constituent element may be called a second constituent element, and the second constituent element may be called the first constituent element in a similar manner.

It should be understood that if a certain constituent element is mentioned to be "connected" or "coupled" to another constituent element, it includes both a case that a certain constituent element is directly connected or coupled to another constituent element and a case that a certain constituent element is connected or coupled to another constituent element via still another constituent element. In contrast, if a certain constituent element is mentioned to be "directly connected or coupled" to another constituent element, it should be understood that a certain constituent element is connected or coupled to another constituent element without intervention of any other constituent element. Other expressions for explaining the relationship between the constituent elements, that is, "between" and "just between" or "neighboring" and "directly neighboring" should be interpreted in the same manner.

The terms used in the present specification are to describe exemplary forms only, but are not intended to limit the present disclosure. A singular expression may include a plural expression unless clearly defined. In the present specification, it should be understood that the team "include" or "have" specifies the presence of stated features, numerals, steps, operations, constituent elements, parts, or a combination thereof, but do not preclude the presence or addition of one or more other features, numerals, steps, operations, constituent elements, parts, or a combination thereof.

Unless otherwise defined, all terms (including technical and scientific terms) used herein could be used as meanings commonly understood by those ordinary skilled in the art to which the present disclosure belongs. The terms that are used in the present specification and are defined in a generally used dictionary should be interpreted as meanings that are identical or similar to the meanings of the terms from the context of the related technology, and they are not interpreted as an ideally or excessively formal meaning unless clearly defined.

A desorption process and a heating/desorption process used in the present specification may mean the same process, and a cleaning process and a cooling/cleaning process may mean the same process.

Hereinafter, the present disclosure will be described in detail through description of exemplary forms of the present disclosure with reference to the accompanying drawings. The same reference numerals proposed in the respective drawings denote the same members.

Figure 1:
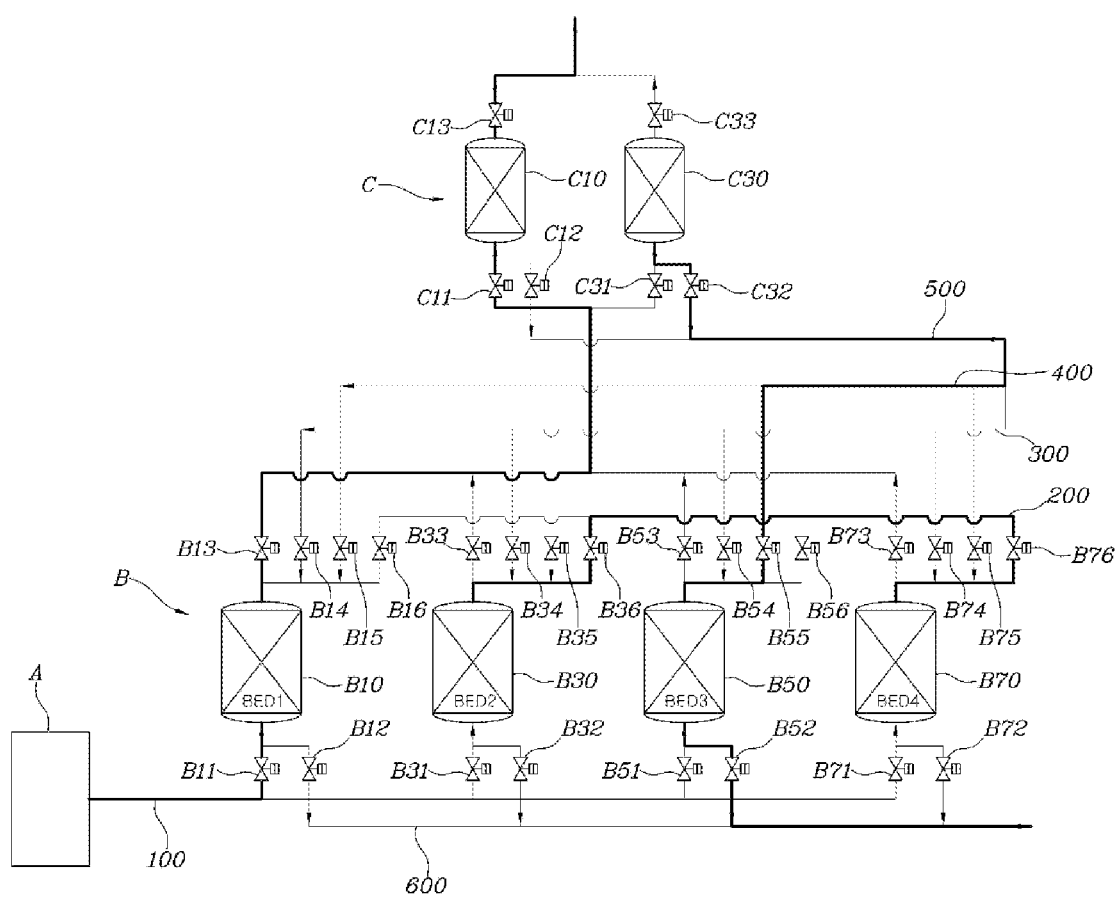
Figure 3:
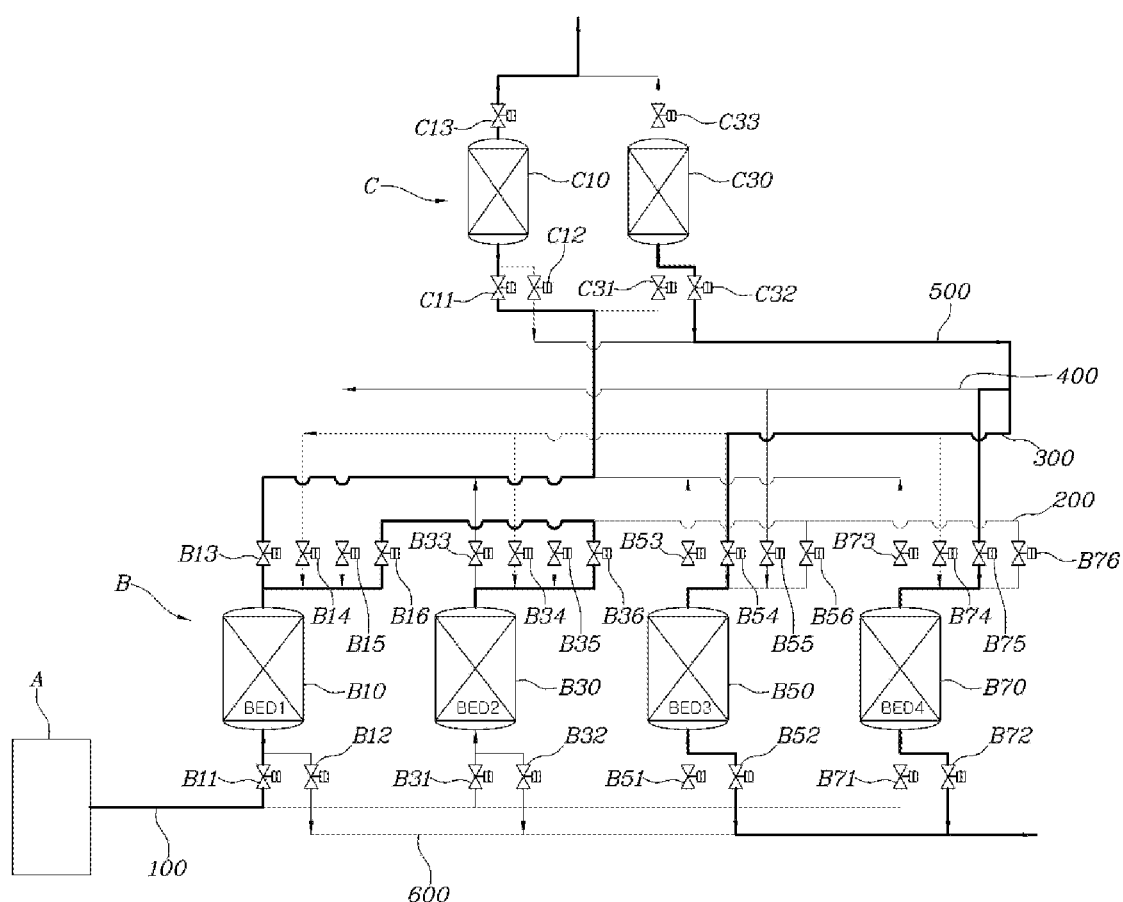
FIGS. 3 and 4 are a drawing and a process chart showing the fourth-stage process of a system for generating hydrogen through ammonia adsorption according to another form of the present disclosure, respectively.
Figure 4:
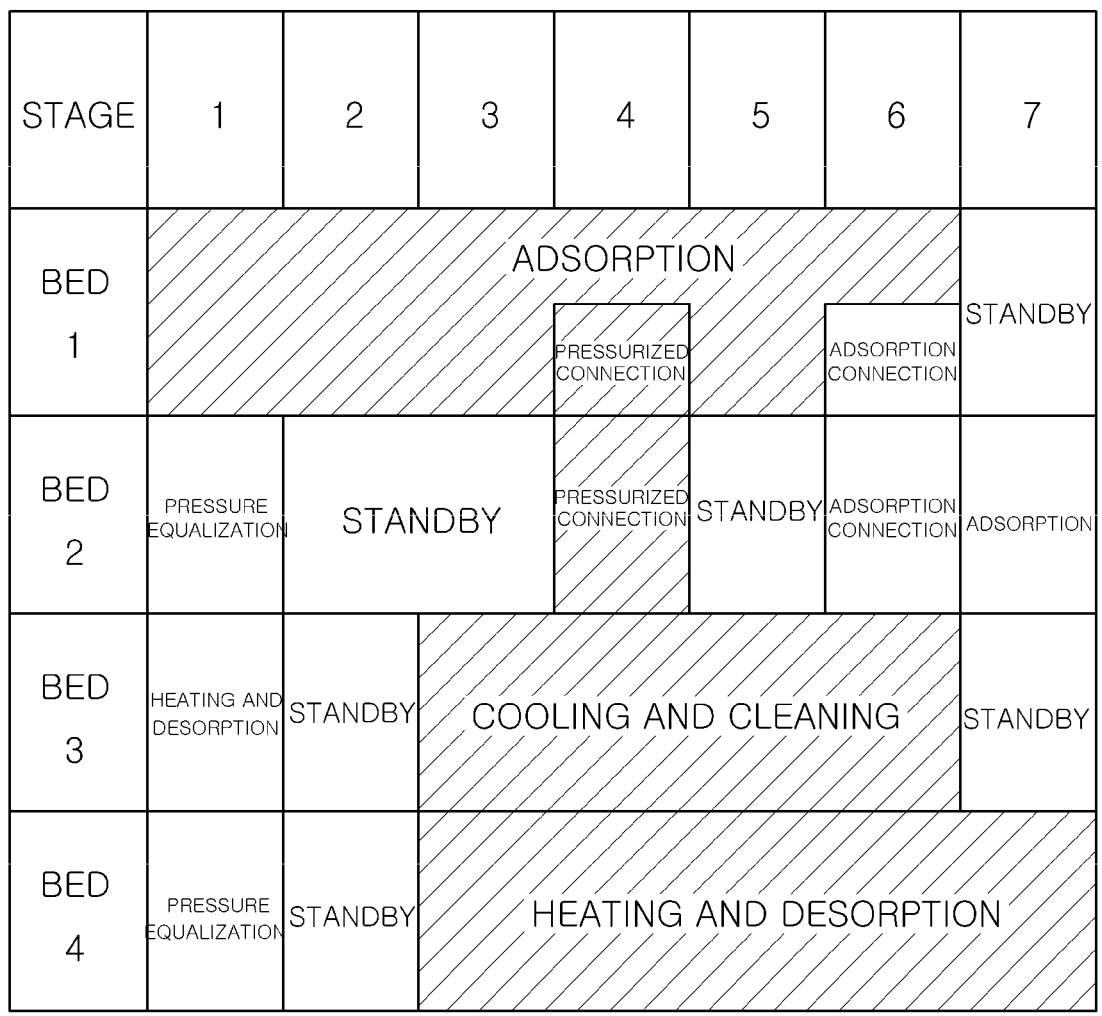
Figure 5:
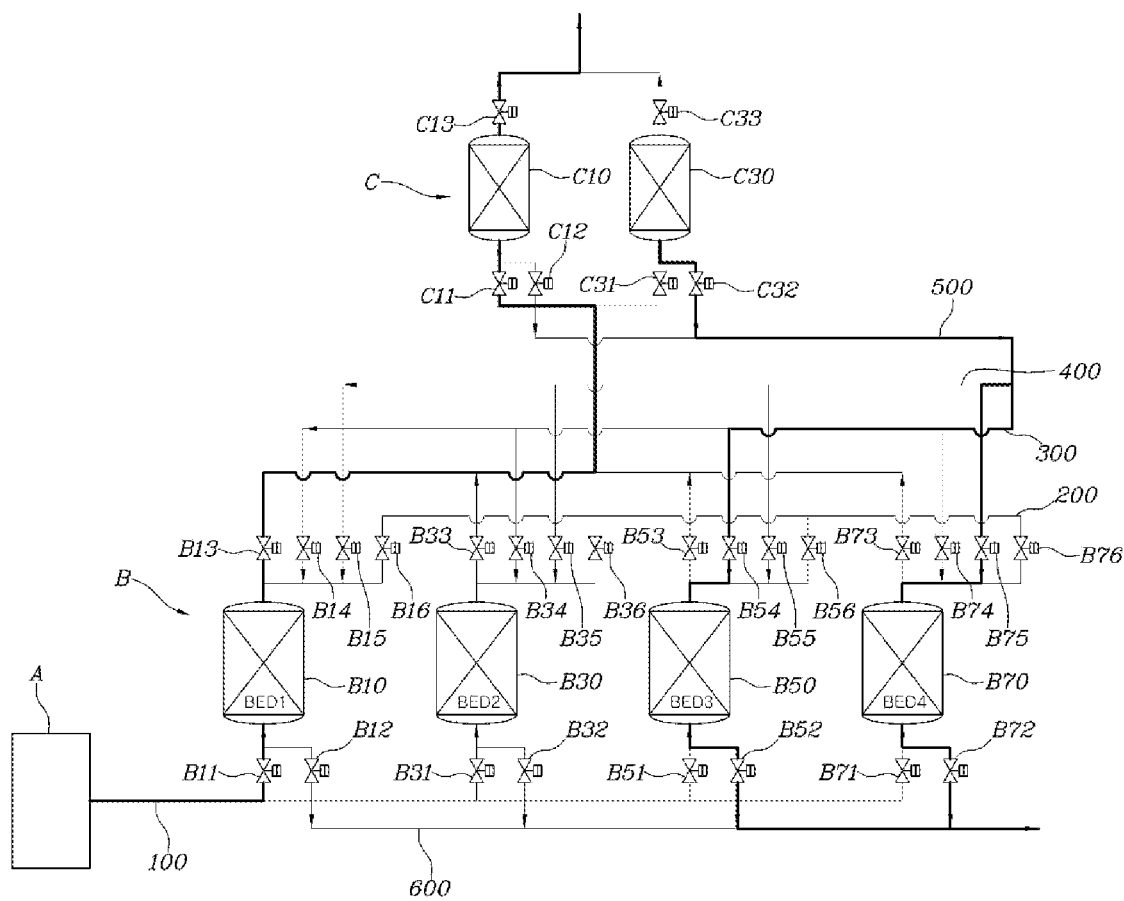
Figure 7:
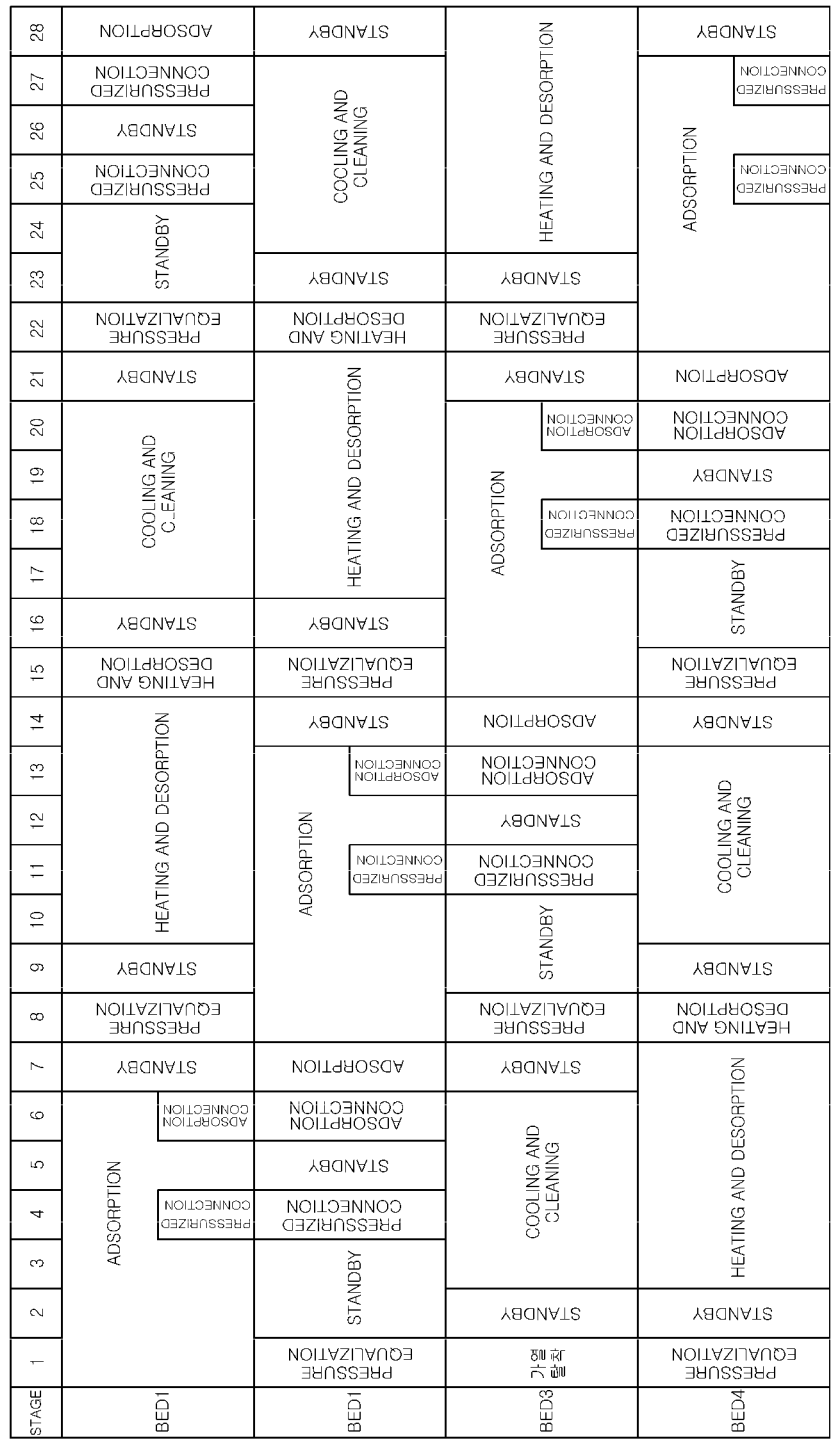
FIG. 7 is a process chart showing a repeated process of the system for generating hydrogen through ammonia adsorption according to another form of the present disclosure.

FIGS. 1 and 2 are a drawing and a process chart showing a first-stage process of a system for generating hydrogen through ammonia adsorption according to one form of the present disclosure, respectively, FIGS. 3 and 4 are a drawing and a process chart showing a fourth-stage process of the system for generating hydrogen through ammonia adsorption according to another form of the present disclosure, respectively, FIGS. 5 and 6 are a drawing and a process chart showing a sixth-stage process of the system for generating hydrogen through ammonia adsorption according to an exemplary form of the present disclosure, respectively, FIG. 7 is a process chart showing a repeated process of the system for generating hydrogen through ammonia adsorption according to another form of the present disclosure, FIG. 8 is a flowchart of a generation method occurring in an ammonia adsorption bed in a method for generating hydrogen through ammonia adsorption in one form of the present disclosure, and FIG. 9 is a flowchart of a generation method occurring in a nitrogen adsorption bed in the method for generating hydrogen through ammonia adsorption according to other form of the present disclosure.

FIGS. 1 and 2 are a drawing and a process chart showing a first-stage process of a system for generating hydrogen through ammonia adsorption according to one form of the present disclosure, respectively. The system for generating hydrogen includes an ammonia decomposition bed "A" configured to introduce an ammonia gas, decompose the ammonia gas into a high-pressure first mixed gas including nitrogen and hydrogen, and discharge the first mixed gas; an ammonia adsorption bed "B" supplied with the high-pressure first mixed gas from the ammonia decomposition bed A, and configured to adsorb residual ammonia of the first mixed gas, and discharge a high-pressure second mixed gas including nitrogen and hydrogen; and a nitrogen adsorption bed "C" directly supplied with the high-pressure second mixed gas from the ammonia adsorption bed B, and configured to adsorb the nitrogen, and discharge the hydrogen.

Specifically, the system for generating hydrogen according to the present disclosure includes the ammonia decomposition bed A, the ammonia adsorption bed B, and the nitrogen adsorption bed C. The ammonia decomposition bed A introduces the ammonia gas, decomposes the ammonia gas into the high-pressure first mixed gas including the nitrogen and hydrogen, and discharges the high-pressure first mixed gas. The ammonia adsorption bed B is supplied with the high-pressure first mixed gas from the ammonia decomposition bed A, adsorbs the residual ammonia of the first mixed gas, and discharges the high-pressure second mixed gas including the nitrogen and hydrogen. The nitrogen adsorption bed C is directly supplied with the high-pressure second mixed gas from the ammonia adsorption bed B, adsorbs the nitrogen, and discharges the hydrogen.

The present disclosure is to generate the hydrogen through decomposition of the ammonia. For this, the ammonia decomposition bed A first introduces the ammonia gas, and decomposes the ammonia gas into the nitrogen and the hydrogen.

The trace ammonia is unable to be decomposed and exists in a mixed state with the nitrogen and the hydrogen. Pure hydrogen can be obtained only when the ammonia adsorption bed B adsorbs/removes the ammonia, and the nitrogen adsorption bed C adsorbs/removes the nitrogen.

In this case, in the related art, since the process is performed, in which the ammonia-removed first mixed gas is stored in a separate storage container, and then is subjected to the nitrogen adsorption again, a loss of pressure occurs, and thus there is a problem in that a separate compressor for the nitrogen adsorption process is necessary.

According to the present disclosure, since an ammonia adsorption process and a nitrogen adsorption process are consecutively arranged, the mixed gas is directly transmitted and operated under high-pressure condition (over 8 bar) from the beginning, and thus hydrogen can be produced through removal of the ammonia and the nitrogen even without a separate compressor. Through this, the efficiency is increased since the process time is shortened, and system simplification and cost saving can be achieved since the separate compressor is not necessary.

In one form, the ammonia adsorption bed B may include a plurality of first bed modules B10, B30, B50, and B70, and the first bed modules may each independently perform an ammonia adsorption process, an ammonia desorption process, and a cleaning process, and the nitrogen adsorption bed C may include a plurality of second bed modules C10 and C30, and the second bed modules may each independently perform a nitrogen adsorption process and a nitrogen desorption process.

The plurality of first bed modules B10, B30, B50, and B70 may be connected in parallel through a discharge line 100, the discharge line 100 may be connected to the plurality of second bed modules C10 and C30, and in case that the modules adsorbing the ammonia among the first bed modules are connected to the second bed modules through the discharge line 100 to provide the second mixed gas, connection of the remaining first bed modules to the discharge line 100 may be cut off.

The plurality of second bed modules C10 and C30 may be connected in parallel to an off-gas supply line 500, the plurality of first bed modules B10, B30, B50, and B70 may be connected in parallel through a desorption line 400 and a cleaning line 300, and the desorption line 400 and the cleaning line 300 may be branched from the off-gas supply line 500.

Through the above configuration, the ammonia adsorption bed B and the nitrogen adsorption bed C each include the plurality of modules. Thus, in case that the respective processes are properly arranged and the respective beds are independently operated, the hydrogen can be successively generated without system interruption. FIG. 7 shows an example of corresponding effective process arrangements.

The second bed module may supply the off-gas, including the nitrogen generated through the nitrogen desorption process, to the ammonia adsorption bed B through the off-gas supply line 500, and the first bed modules of the ammonia adsorption bed B may each independently perform the ammonia desorption process and the cleaning process using the off-gas.

In one form, the ammonia desorption process and the cleaning process may be performed through introduction of separate outdoor air (atmosphere). However, in case of using the off-gas, a separate outdoor air introduction device is not required, which makes it possible to simplify the system, and there is a small change in the gas composition inside the ammonia adsorption bed, which makes it possible to stably operate the processes.

The plurality of first bed modules B10, B30, B50, and B70 may be connected in parallel through a pressure equalization line 200, and the adsorption-scheduled first bed module may be connected to the adsorption-terminated first bed module through the pressure equalization line 200 and may perform an equalization process before the adsorption process. Accordingly, the equalization process transmits the pressure of the adsorption-terminated first bed module to the adsorption-scheduled first bed module. Thus, the loss of hydrogen can be minimized, and the processes can be stably operated through minimization of the loss of pressure.

The adsorption-scheduled first bed module may be connected, through the pressure equalization line 200, to the first bed module performing the adsorption process after the equalization process, and may perform a pressurization process before the adsorption process. Through this, in the same manner as the equalization process, the pressurization process can minimize the loss of pressure, and thus the processes can be stably operated.

Hereinafter, procedures of the respective processes will be described in detail through the drawings.

FIGS. 1 and 2 are a drawing and a process chart showing a first-stage process of a system for generating hydrogen through ammonia adsorption according to some forms of the present disclosure, respectively. The adsorption processes being performed by the ammonia adsorption bed 1 B10 and the nitrogen adsorption bed 1 C10 of FIG. 1 are as follows.

The ammonia adsorption bed 1 B10 may adsorb/remove ammonia from the first mixed gas transmitted to the ammonia adsorption bed 1 B10 through the discharge line 100, and transmit the resultant gas as the second mixed gas to the nitrogen adsorption bed 1 C10, and the nitrogen adsorption bed 1 C10 may adsorb/remove the nitrogen from the second mixed gas to obtain pure hydrogen. In this case, as for the valve open/close state, valves B11, B13, C11, and C13 are in an open state, and valves B12, B14, B15, B16, and C12 are in a closed state.

The desorption process being performed by the ammonia adsorption bed 3 B50 of FIG. 1 is as follows. The ammonia is desorbed through heating of the bed using the off-gas being transmitted from the nitrogen adsorption bed 2 C30 and a heater mounted on the ammonia adsorption bed 3 B50. In one form, a space speed of the off-gas is equal to or higher than 1000 $h^{-1}$ and equal to or lower than 2000 $h^{-1}$. In the heating/desorption process, if the space speed of the off-gas is lower than 1000 $h^{-1}$, the desorption speed becomes low, whereas if the space speed of the off-gas exceeds 2000 $h^{-1}$, it may be difficult to adjust the internal temperature of the ammonia adsorption bed. In this case, as for the valve open/close state, valves C32, B55, and B52 are in an open state, and valves C31, B53, B54, B56, and B51 are in a closed state.

The equalization process being performed between the ammonia adsorption bed 2 B30 and the ammonia adsorption bed 4 B70 is as follows. Valves B36 and B76 are open, and the ammonia adsorption bed 2 B30 receives the pressure transmitted from the ammonia adsorption bed 4 B70 through the pressure equalization line 200. In this case, as for the valve open/close state, valves B36 and B76 are in an open state, and valves B31, B32, B33, B34, B35, B71, B72, B73, B74, and B75 are in a closed state.

In one form, the ammonia adsorption bed 4 B70 is in a high-pressure state since the ammonia adsorption is completed in the previous stage. Since the ammonia adsorption bed 2 B30 is a bed to perform the ammonia adsorption next to the ammonia adsorption bed 1 B10, maintaining a predetermined level of pressure may help with process stabilization, and minimize the loss of pressure and the loss of hydrogen.

FIGS. 3 and 4 are a drawing and a process chart showing a fourth-stage process of the system for generating hydrogen through ammonia adsorption according to another form of the present disclosure, respectively. Referring to FIGS. 3 and 4, in stage 4, the ammonia adsorption bed 1 B10 continuously proceeds with the adsorption reaction, and at the same time, the pressurization process is performed through the pressure equalization line 200 between the ammonia adsorption bed 1 B10 and the ammonia adsorption bed 2 B30. The ammonia adsorption bed 3 B50 proceeds with the cleaning process, and the ammonia adsorption bed 4 B70 proceeds with the desorption process.

The ammonia adsorption bed 4 B70 proceeds with the desorption process in the same manner as in the ammonia adsorption bed 3 B50 of stage 1.

The pressurization process occurring between the ammonia adsorption bed 1 B10 and the ammonia adsorption bed 2 B30 will be described in detail. The ammonia adsorption bed 1 B10 is in a high-pressure state through proceeding with the adsorption process, and the ammonia adsorption bed 2 B30 is in a lower-pressure state than that of the ammonia adsorption bed 1 B10 although the ammonia adsorption bed 2 B30 has received the transmitted pressure through the equalization process with the ammonia adsorption bed 4 B70. Accordingly, if the valves B16 and B36 are open, the pressure moves from the ammonia adsorption bed 1 B10 to the ammonia adsorption bed 3 B30 through the pressure equalization line 200. In the same manner as the equalization process, this process can help with the process stabilization, and can minimize the loss of pressure. In this case, as for the valve open/close state, the valves B16 and B36 including B11, B13, C11, and C13 are in an open state, and the valves B12, B14, B15, C12, B31, B32, B33, B34, and B35 are in a closed state.

The cleaning process being performed in the ammonia adsorption bed 3 B50 will be described in detail. The ammonia adsorption bed 3 B50 is cooled and cleaned using the off-gas being transmitted from the nitrogen adsorption bed 2 C30, and in this case, the space speed of the off-gas may be equal to or higher than 6000 $h^{-1}$. In the cleaning process, if the space speed of the off-gas is lower than 6000 $h^{-1}$, the bed cooling time may be lengthened. In this case, as for the valve open/close state, the valves C32, B54, and B52 are in an open state, and the valves C31, B55, B56, and B51 are in a closed state.

FIGS. 5 and 6 are a drawing and a process chart showing a sixth-stage process of the system for generating hydrogen through ammonia adsorption according to another form of the present disclosure, respectively. Referring to FIGS. 5 and 6, in stage 6, the ammonia adsorption bed 3 B50 continues the cleaning process, and the ammonia adsorption bed 4 B70 continues the desorption process. The adsorption/connection process occurring between the ammonia adsorption bed 1 B10 and the ammonia adsorption bed 2 B30 will be described in detail. In the ammonia adsorption bed 1 B10, as the valves B11 and B13 are closed and the valves B31 and B33 are open at the same time, the ammonia adsorption of the ammonia adsorption bed 2 B30 starts. As the valves B11 and B13 are completely closed and the valves B31 and B33 are completely open at the same time, the ammonia adsorption bed 1 B10 completes the adsorption process, and the ammonia adsorption bed 2 B30 proceeds with the adsorption process.

FIG. 7 is a process chart showing a repeated process of the system for generating hydrogen through ammonia adsorption according to one form of the present disclosure. Referring to this, as described above, it can be known that the respective ammonia adsorption beds perform total four kinds of processes including ammonia adsorption—desorption—cleaning—standby independently in a crosswise manner.

FIG. 8 is a flowchart of a generation method occurring in an ammonia adsorption bed in a method for generating hydrogen through ammonia adsorption according to another form of the present disclosure, and FIG. 9 is a flowchart of a generation method occurring in a nitrogen adsorption bed in the method for generating hydrogen through ammonia adsorption according to one form of the present disclosure.

A method for generating hydrogen through ammonia adsorption and nitrogen adsorption is as follows. Referring to FIGS. 8 and 9, the method for generating hydrogen may include: decomposing an ammonia gas into a high-pressure first mixed gas including nitrogen and hydrogen through an ammonia decomposition bed; adsorbing ammonia through transmission of the high-pressure first mixed gas to an ammonia adsorption bed, and discharging a high-pressure second mixed gas including nitrogen and hydrogen; and adsorbing the nitrogen and discharging the hydrogen through direct transmission of the high-pressure second mixed gas from the ammonia adsorption bed to a nitrogen adsorption bed.

The ammonia adsorption bed and the nitrogen adsorption bed include a plurality of first bed modules and a plurality of second bed modules, respectively, and the first bed modules may receive an off-gas including the nitrogen desorbed, from the second bed modules, and may each independently perform the ammonia adsorption process and the cleaning process.

In another form, the ammonia decomposition bed decomposes the ammonia into the nitrogen and hydrogen, and transmits the high-pressure first mixed gas including the nitrogen and hydrogen to the ammonia adsorption bed (S100). The ammonia adsorption bed adsorbs/removes the ammonia, and transmits the second mixed gas including the nitrogen to the nitrogen adsorption bed (S600). The steps S100 and S600 are associated with each other. After the ammonia adsorption bed completes the ammonia adsorption, the bed heating/ammonia desorption process is performed (S300). After the heating/desorption process of the ammonia adsorption bed is completed, the bed cooling/cleaning process is performed (S400). The off-gas being used in the heating/desorption process and the cooling/cleaning process of the ammonia adsorption bed is transmitted from the nitrogen adsorption bed, and the heating/desorption and cooling/cleaning processes of the ammonia adsorption bed are performed through the nitrogen desorption process of the nitrogen adsorption bed and the off-gas transmission (S700). That is, steps S300 and S400 and step S700 are associated with each other. After completion of the cooling/cleaning process of the ammonia adsorption bed, the ammonia adsorption bed is in a standby state for re-adsorption of the ammonia (S500).

The ammonia adsorption bed receives the off-gas including the nitrogen and transmitted from the nitrogen adsorption bed, and performs the heating/desorption process and the cooling/cleaning process. In one form, the space speed of the off-gas being supplied in the ammonia adsorption process of the first bed module is equal to or higher than 1000 $h^{-1}$ and equal to or lower than 2000 $h^{-1}$, and the space speed of the off-gas being supplied in the ammonia cooling/cleaning process of the first bed module is equal to or higher than 6000 $h^{-1}$.

In another form, in the heating/desorption process, if the space speed of the off-gas is lower than 1000 $h^{-1}$, the desorption speed becomes lower, and in case of the flow rate exceeding 2000 $h^{-1}$, it may be difficult to adjust the internal temperature of the bed. In the cooling/cleaning process, if the space speed of the off-gas is lower than 6000 $h^{-1}$, the bed cooling time may be lengthened.

It has been confirmed that the concentration of the ammonia in the mixed gas being discharged through the system and the method for generating hydrogen through the ammonia adsorption is equal to or lower than 0.1 ppm, which may be used for PEMFC, and as the more accurate result, the concentration of the ammonia is equal to or lower than 0.004 ppm.

According to the system and the method for generating hydrogen through ammonia adsorption according to the present disclosure, the efficiency of the system can be increased since the ammonia and nitrogen removal processes are associated with each other, and a separate compressor is not necessary between the ammonia adsorption bed and the nitrogen adsorption bed since the system directly transmits and operates the high-pressure gas. Further, since the off-gas is used when the ammonia adsorption bed is heated or cooled, there is a small change in the gas composition, which makes it possible to stably operate the processes.

Although the exemplary forms of the present disclosure have been illustrated and described for illustrative purposes, those of ordinary skill in the art will appreciate that various modifications, additions and substitutions are possible, without departing from the technical idea of the present disclosure.

What is claimed is:

1. A system for generating hydrogen, comprising:
   an ammonia decomposition bed configured to: introduce an ammonia gas, decompose the ammonia gas into a high-pressure first mixed gas including nitrogen and hydrogen, and discharge the high-pressure first mixed gas;
   an ammonia adsorption bed supplied with the high-pressure first mixed gas from the ammonia decomposition bed, and configured to: adsorb residual ammonia of the high-pressure first mixed gas, and discharge a high-pressure second mixed gas including nitrogen and hydrogen; and
   a nitrogen adsorption bed directly supplied with the high-pressure second mixed gas from the ammonia adsorption bed, and configured to: adsorb the nitrogen, and discharge the hydrogen,
   wherein:
   the ammonia adsorption bed includes a plurality of first bed modules, and the plurality of first bed modules each configured to independently perform an ammonia adsorption process, an ammonia desorption process, and a cleaning process.

2. The system according to claim 1, wherein:
the nitrogen adsorption bed includes a plurality of second bed modules, and the plurality of second bed modules each configured to independently perform a nitrogen adsorption process and a nitrogen desorption process.

3. The system according to claim 2, wherein:
the plurality of first bed modules are connected in parallel through a discharge line,
the discharge line is connected to the plurality of second bed modules, and
when first bed modules adsorbing the ammonia among the first bed modules are connected to second bed modules among the plurality of second bed modules through the discharge line to provide the high-pressure second mixed gas, connection of remaining first bed modules among the plurality of first bed modules to the discharge line is cut off.

4. The system according to claim 2, wherein:
the plurality of second bed modules are connected in parallel to an off-gas supply line,
the plurality of first bed modules are connected in parallel through a desorption line and a cleaning line, and
the desorption line and the cleaning line are branched from the off-gas supply line.

5. The system according to claim 4, wherein:
the plurality of second bed modules are configured to supply an off-gas, including nitrogen generated through a nitrogen desorption process, to the ammonia adsorption bed through the off-gas supply line, and
the plurality of first bed modules of the ammonia adsorption bed are configured to each independently perform the ammonia desorption process and the cleaning process using the off-gas.

6. The system according to claim 2, wherein:
the plurality of first bed modules are connected in parallel through a pressure equalization line, and
among the plurality of first bed modules, an adsorption-scheduled first bed module is connected to an adsorption-terminated first bed module through the pressure equalization line and configured to perform an equalization process before the adsorption process.

7. The system according to claim 6, wherein:
among the plurality of first bed modules, the adsorption-scheduled first bed module is connected, through the pressure equalization line, to another first bed module performing the adsorption process after the equalization process, and is configured to perform a pressurization process before the adsorption process.

8. The system according to claim 7, wherein the adsorption-scheduled first bed module is connected to the ammonia decomposition bed after the pressurization process, and configured to perform the ammonia adsorption process.

9. A method for generating hydrogen, comprising:
decomposing an ammonia gas into a high-pressure first mixed gas including nitrogen and hydrogen through an ammonia decomposition bed;
adsorbing ammonia through transmission of the high-pressure first mixed gas to an ammonia adsorption bed, and discharging a high-pressure second mixed gas including nitrogen and hydrogen, wherein the ammonia adsorption bed includes a plurality of first bed modules;
adsorbing the nitrogen and discharging the hydrogen through direct transmission of the high-pressure second mixed gas from the ammonia adsorption bed to a nitrogen adsorption bed; and
independently performing an ammonia adsorption process, an ammonia desorption process and a cleaning process, by each of the plurality of first bed modules.

10. The method according to claim 9, wherein
the nitrogen adsorption bed includes a plurality of second bed modules, and the plurality of second bed modules each independently perform a nitrogen adsorption process and a nitrogen desorption process.

11. The method according to claim 10, further comprising:
providing an off-gas, including the nitrogen desorbed, from the plurality of second bed modules to the plurality of first bed modules; and
independently performing, by each of the plurality of first bed modules, the ammonia adsorption process and the cleaning process.

12. The method according to claim 11, wherein a space speed of the off-gas being supplied in the ammonia adsorption process of the plurality of first bed modules is equal to or higher than 1000 $h^{-1}$ and equal to or lower than 2000 $h^{-1}$, and
a space speed of the off-gas being supplied in the cleaning process of the plurality of first bed modules is equal to or higher than 6000 $h^{-1}$.

* * * * *